United States Patent
Sachee et al.

(10) Patent No.: US 9,474,338 B2
(45) Date of Patent: Oct. 25, 2016

(54) FASTENER

(71) Applicant: APLIX INC., Charlotte, NC (US)

(72) Inventors: Quresh Sachee, Charlotte, NC (US);
John Bumgarner, Maiden, NC (US);
Marc Woodling, Charlotte, NC (US)

(73) Assignee: APLIX, Le Cellier (FR)

( * ) Notice: Subject to any disclaimer, the term of this patent is extended or adjusted under 35 U.S.C. 154(b) by 0 days.

(21) Appl. No.: 14/051,470

(22) Filed: Oct. 11, 2013

(65) Prior Publication Data
US 2015/0101156 A1  Apr. 16, 2015

(51) Int. Cl.
*A44B 18/00* (2006.01)
*F16B 5/07* (2006.01)

(52) U.S. Cl.
CPC ....... *A44B 18/0069* (2013.01); *A44B 18/0011* (2013.01); *A44B 18/0015* (2013.01); *A44B 18/0046* (2013.01); *A44B 18/0073* (2013.01); *F16B 5/07* (2013.01); *Y10T 24/2742* (2015.01)

(58) Field of Classification Search
CPC ... B62D 27/06; Y10T 24/43; Y10T 24/2792; Y10T 24/309; Y10T 24/34
USPC .......... 24/446, 306, 297, 454, 452; 296/214, 296/39.1
See application file for complete search history.

(56) References Cited

U.S. PATENT DOCUMENTS

| | | | | |
|---|---|---|---|---|
| 5,058,245 A | * | 10/1991 | Saito | 24/306 |
| 5,245,732 A | * | 9/1993 | Johnston | 24/306 |
| 5,500,268 A | * | 3/1996 | Billarant | 428/100 |
| 5,537,720 A | * | 7/1996 | Takizawa et al. | 24/452 |
| 5,537,793 A | * | 7/1996 | Murasaki | 52/585.1 |
| 5,579,562 A | * | 12/1996 | Hattori et al. | 24/452 |
| 5,634,245 A | * | 6/1997 | Rouser et al. | 24/452 |
| 5,655,268 A | * | 8/1997 | Keyaki et al. | 24/114.9 |
| 5,678,286 A | * | 10/1997 | Murasaki | A44B 18/0046 24/444 |
| 5,800,760 A | * | 9/1998 | Takizawa | A44B 18/0049 264/167 |
| 5,857,245 A | * | 1/1999 | Sakakibara | A44B 18/0049 24/306 |
| 5,860,194 A | * | 1/1999 | Takizawa | A44B 18/0046 24/390 |
| 6,112,377 A | * | 9/2000 | Wilson | 24/452 |
| 6,254,304 B1 | * | 7/2001 | Takizawa | A44B 18/0046 24/444 |
| 6,314,622 B1 | * | 11/2001 | Takizawa et al. | 24/306 |

(Continued)

FOREIGN PATENT DOCUMENTS

JP     H09-23907 A     1/1997

OTHER PUBLICATIONS

European Search Report and Opinion from corresponding EP Application No. EP 1319 4264 mailed on Apr. 9, 2015 (5 pages).

*Primary Examiner* — Robert J Sandy
*Assistant Examiner* — Jason W San
(74) *Attorney, Agent, or Firm* — Bookoff McAndrews, PLLC

(57) ABSTRACT

A fastening element is provided having a gripping portion, a plurality of gripping elements extending from the gripping portion, a supporting portion being defined by at least one supporting-portion wall extending from the gripping portion in a direction opposite that of the gripping elements, the supporting portion having a supporting-portion width smaller than a gripping-portion width of the gripping portion, such that a top flange is formed by the gripping portion relative to the supporting portion on at least one side of the fastening element, and an anchoring portion extending from a distal end of at least one supporting-portion wall and parallel to the gripping portion so as to form a bottom flange relative to the supporting portion on the at least one side corresponding to the top flange.

14 Claims, 3 Drawing Sheets

(56) References Cited

U.S. PATENT DOCUMENTS

| | | | |
|---|---|---|---|
| 6,430,786 B1* | 8/2002 | Ikeda et al. | 24/444 |
| 6,451,239 B1* | 9/2002 | Wilson | 264/491 |
| 6,572,945 B2* | 6/2003 | Bries et al. | 428/40.1 |
| 6,772,484 B2* | 8/2004 | Miyano et al. | 24/297 |
| 7,048,984 B2* | 5/2006 | Seth et al. | 428/100 |
| 7,132,144 B2* | 11/2006 | Roberts | 428/40.2 |
| 7,141,283 B2* | 11/2006 | Janzen et al. | 428/36.9 |
| 7,308,738 B2* | 12/2007 | Barvosa-Carter et al. | 24/442 |
| 7,390,057 B2* | 6/2008 | Autterson | 296/214 |
| 7,582,105 B2 | 9/2009 | Kolster | |
| 7,695,057 B2* | 4/2010 | Autterson | 296/214 |
| 8,281,463 B2 | 10/2012 | Hammer et al. | |
| 2004/0137192 A1* | 7/2004 | McVicker | 428/100 |
| 2008/0244878 A1* | 10/2008 | Hoehe et al. | 24/445 |
| 2011/0057466 A1 | 3/2011 | Sachee | |
| 2011/0111165 A1 | 5/2011 | Mahe | |
| 2011/0167598 A1* | 7/2011 | Cheng | 24/306 |
| 2011/0209810 A1 | 9/2011 | Autterson | |
| 2012/0011685 A1* | 1/2012 | Rocha | 24/449 |
| 2013/0000085 A1* | 1/2013 | Cina et al. | 24/450 |

* cited by examiner

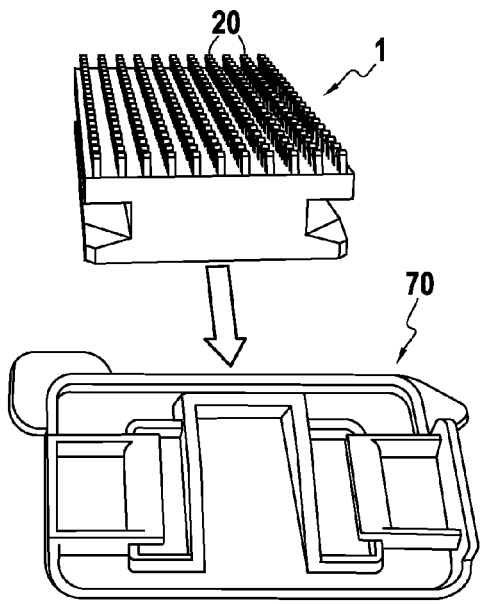
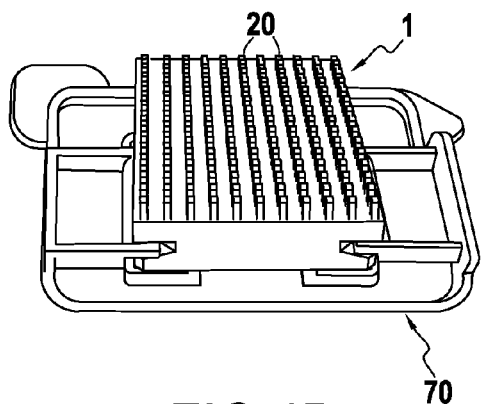
FIG.4A  FIG.4B
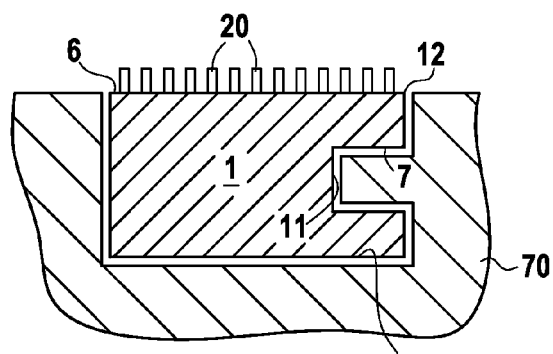
FIG.5
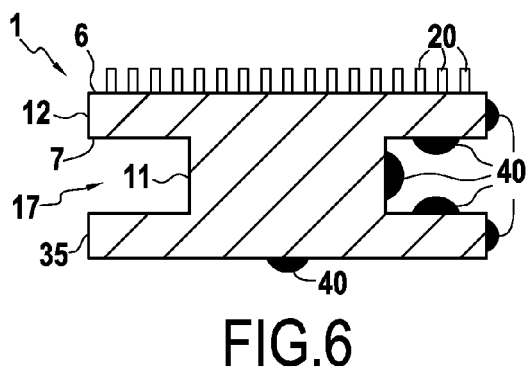
FIG.6

FASTENER

FIELD OF THE DISCLOSURE

The disclosure relates to fasteners, and more particularly to a slide-in fastener configured for anchoring components.

BACKGROUND OF THE DISCLOSURE

In various industries fasteners play a critical role in the assembly of various products, and it is generally desirable to enable such fasteners to be unfastened in order to permit servicing components either associated with the fasteners or enclosed within an area secured by such fasteners. While it is desirable to enable such fasteners to be unfastened it is also important that such fasteners hold tightly under varying stresses and loads, while also remaining free from generation of sound due to vibration, among others.

For example, in the automotive industry many pieces of a vehicle are fastened to other pieces of the vehicle, e.g. headliners to a roof of the vehicle, and it is important that these fasteners have high closure strength, while remaining silent. It is also desirable that these fasteners are easy to install while also facilitating removal when repairs are needed.

U.S. Pat. No. 7,695,057 discloses a plastic spacer/riser to increase usable height of a reclosable fastening system, such as 3M™ Dual Lock™ or Velcro® hook and loop products. The spacer/riser is adapted to be held in place on an external substrate with hot-melt glues sonic welds, pressure-sensitive adhesives, acrylic foam tape, or screws. Such techniques however, may result in eventual failure of the device after periods of varying vibration.

It is accordingly a primary object of the disclosure to provide a fastener which is easy to install, holds fast to the fastened elements, and facilitates removal, but only when desired.

SUMMARY OF THE DISCLOSURE

In accordance with the disclosure, a fastening element is provided. The fastening element may include a gripping portion, a plurality of gripping elements extending from the gripping portion, and a supporting portion being defined by at least one supporting-portion wall extending from the gripping portion in a direction opposite that of the gripping elements, the supporting portion having a supporting-portion width smaller than a gripping-portion width of the gripping portion, such that a top flange is formed by the gripping portion relative to the supporting portion on at least one side of the fastening element. The fastening element also includes an anchoring portion extending from a distal end of at least one supporting-portion wall and parallel to the gripping portion so as to form a bottom flange relative to the supporting portion on the at least one side corresponding to the top flange.

The fastening element, the plurality of gripping elements, the supporting portion, and the anchoring portion can be together formed unitarily and the supporting portion can be defined by at least two supporting-portion walls.

The supporting portion may include a crosspiece extending between two of the supporting portion walls, and the crosspiece may include a raised portion extending beyond a plane comprising the anchoring portion and the crosspiece.

An interior volume defined by the supporting-portion walls can be substantially void, e.g., of material and/or any structure.

The supporting-portion width can be between 5 and 95 percent of the gripping portion width, possibly between 25 to 75%, and even 60 to 95%. For example, a supporting portion width may be between 1.5 mm and 5 mm according to some embodiments.

At least two other sides of the gripping portion and the anchoring portion can be void of any flange, for example, three sides of a rectangle may be void of a flange.

A thickness of the fastening element, defined as the distance from a plane comprising a top of the first face to a plane comprising a bottom surface of the anchoring portion, is between 4 and 10 millimeters.

A projection of the gripping portion presents a shape in 2 dimensions that is a four-sided polygon, for example, the shape may be a rectangle having a length dimension between 20 and 30 millimeters, and a width between 25 and 35 millimeters.

According to some embodiments of the present disclosure, a fastening element is provided. The fastening element may have a gripping portion having a first face and a second face the first face of the gripping portion comprising a plurality of gripping elements, and an anchoring portion offset from the second face and extending parallel thereto so as to form a flange portion, wherein the flange portion comprises at least one chamfer located at a terminal section of the flange portion.

The at least one chamfer may extend in a direction parallel to the second face, and may form an angle with a plane perpendicular to the second face ranging between 1 and 60 degrees, for example, between 20 and 45 degrees.

The flange portion may comprise at least two chamfers at the terminal section, and one of the at least two chamfers may extend in a plane forming an acute angle to the second face. The acute angle can range between 10 and 30 degrees.

According to some embodiments of the present disclosure, a fastening element having a body is provided. The fastening element may include a gripping portion, a plurality of gripping elements extending away from the gripping portion, an anchoring portion opposite to the gripping portion and extending parallel thereto so as to form a flange portion relative to the gripping portion and a groove therebetween, and at least one protrusion, wherein, the at least one protrusion extends from a plane comprising a bottom surface of the anchoring portion and beyond an envelope surface of the fastening element body, or the at least one protrusion extends within the groove.

The at least one protrusion may include at least two protrusions, and at least one of the at least two protrusions may extend within the groove.

The at least one protrusion may be configured to exert a reactive force on the flange portion following installation of the fastening element.

At least a portion of an edge of the at least one protrusion may be arcuate, and further, the at least one protrusion may be at least partially spherical.

The at least one protrusion may have a radius of curvature ranging between 14 and 18 millimeters.

The at least one protrusion may be located at the geometric center of the plane.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate one (several) embodiment(s) of the disclosure and together with the description, serve to explain the principles of the disclosure.

FIGS. 4A and 4B represent embodiments related to an installation housing and fastener device;

FIG. 5 is a representation of another exemplary fastener according to embodiments of the present disclosure;

FIG. 6 is an exemplary representation highlighting placement of protrusions according to embodiments of the present disclosure.

DESCRIPTION OF THE EMBODIMENTS

Reference will now be made in detail to the present exemplary embodiments of the disclosure, examples of which are illustrated in the accompanying drawings. Wherever possible, the same reference numbers will be used throughout the drawings to refer to the same or like parts.

Figure 1A:
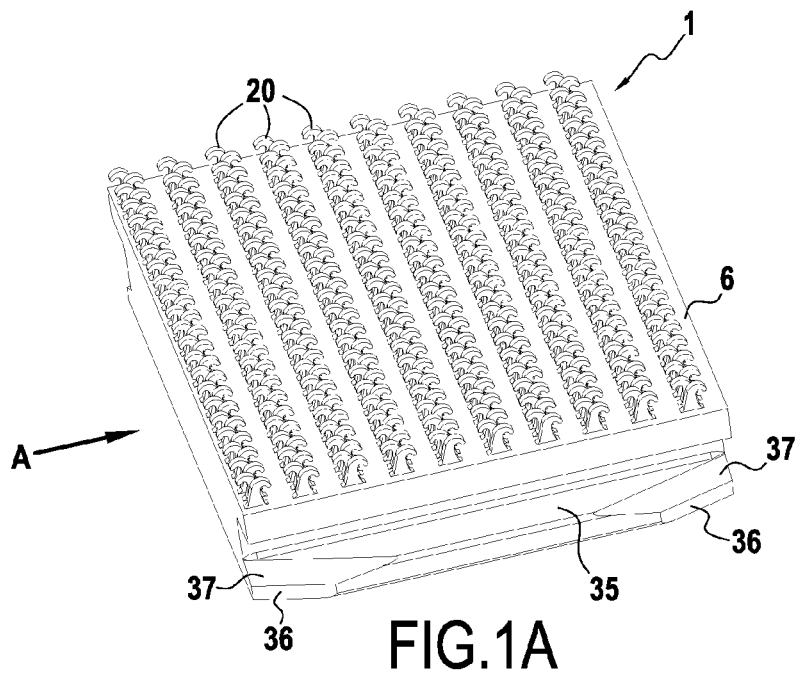
FIG. 1A is a perspective top-view representation of an exemplary fastener device according to embodiments of the present disclosure.
Figure 1B:
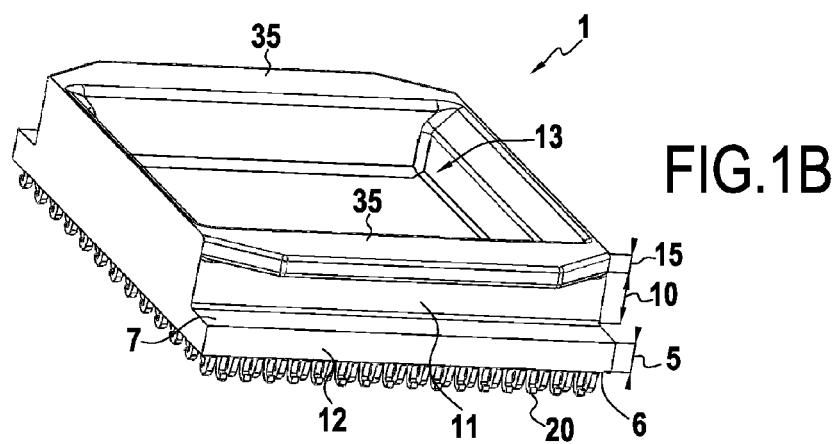
FIG. 1B is a perspective bottom-view representation of an exemplary fastener device according to embodiments of the present disclosure.
Figure 1C:
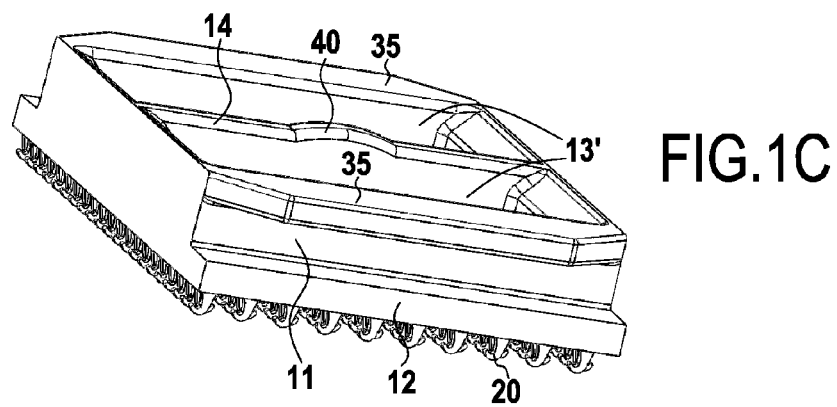
FIG. 1C is a perspective bottom-view representation of another exemplary fastener device according to embodiments of the present disclosure.

FIG. 1A is a perspective top-view drawing of an exemplary fastener 1 according to embodiments of the present disclosure, while FIGS. 1B and 1C are perspective bottom-view representation of exemplary fasteners according to embodiments disclosed herein. Fastener 1 may be molded, e.g., injection molded, using various materials, for example, thermoplastic, composite, and/or other suitable materials. Thermoplastic materials may include polypropylenes or polyurethanes according to embodiments of the present disclosure. For example, for a polypropylene, a mixture of unsaturated polyester constituted by 50% homopolymer and 50% copolymer can be chosen, having a fluidity index in molten state of 22 g/10 mn and a flexion module of 130,000 to 150,000 psi. Other possible materials include a polypropylene of Atofina, PPC 5660, having a fluidity index in molten state of 7 and a flexion module of 175,000 psi, propylene copolymers of BP Amoco (Acclear 8949 and Acctuf impact copolymer 3934X) having fluidity index values in molten state of 35 to 100, and flexion modules of 190,000 to 250,000 psi; polystyrenes, acrylonitrile butadiene styrenes, high density polyethylene, low density linear polyethylene, polycarbonate. The indexes in molten state are between 1 and 100 and the flexion modules are between 30,000 and 1,140,000, preferably between 100,000 and 1,000,000, more preferably between 300,000 and 1,000,000.

Resins other than propylene-based resins which may be suitable include impact polystyrene, acrylonitrile butadiene styrene, nylon, high density polyethylene, low density linear polyethylene, polycarbonate and olefinic thermoplastic resins. Polypropylenes can also be provided which are reinforced by long glass fibers, having a very high flexion module (resin 30YM240/10010 having a flexion module of 856,000 psi and resin 40YM240/10010 having a flexion module of 1,140,000 psi, sold by StaMax). In this case, the long glass fibers do not migrate into the cavities (which are too small or too thin for the long fibers to penetrate therein), and a very rigid plate is obtained with flexible hooks.

According to some embodiments, fastener 1 is injection molded using a single-step process such that the resulting device is of unitary construction, i.e., all elements of fastener 1 are integrally formed. Such formation may yield desirable strength and ease of fabrication, as well as eliminating need for assembly of layered portions (e.g., a gripping portion layer) to a base layer. The device may comprise a visible injection gate.

Figure 2:
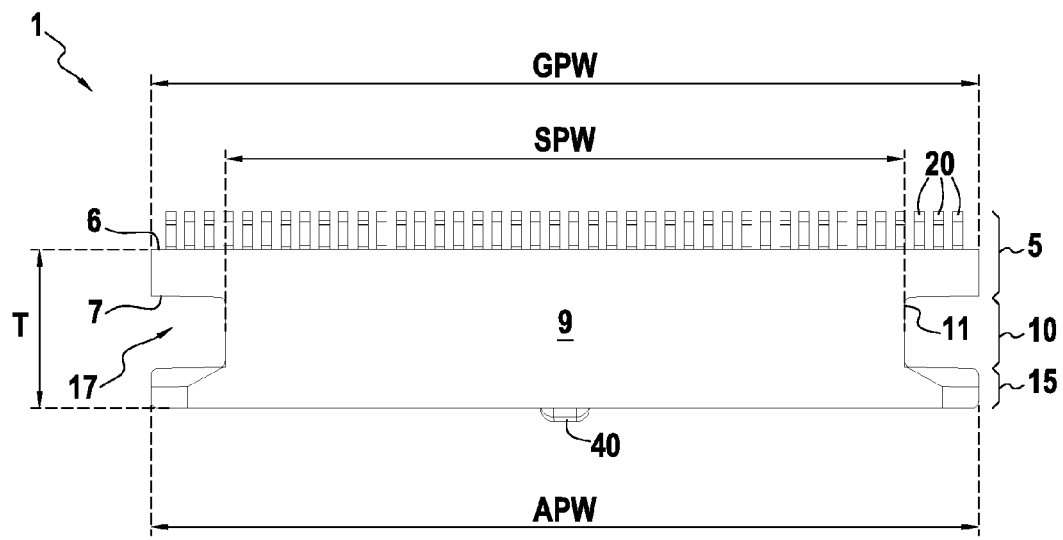
FIG. 2 is an elevation view of the fastener device shown at FIG. 1A viewed from point A.

FIG. 2 is an elevation view of the fastener device shown at FIG. 1A viewed from point A. Fastener 1 may present a gripping portion 5, a supporting portion 10, and an anchoring portion 15, among others. For purposes of the present disclosure, gripping portion 5, supporting portion 10, and anchoring portion 15 may collectively be referred to as a body 9 of fastener 1, and thickness T of body 9 shall be considered the thickness of fastener 1. Thickness T according to some embodiments may be between about 2 and 30 millimeters, 4 and 10 millimeters, or even 5 and 8 millimeters.

Gripping portion 5 may present a first face 6 and a second face 7, gripping portion 5 being of any suitable geometric shape and presenting a gripping-portion width GPW measured across a face of gripping portion 5. For example, gripping portion 5 may present a first face 6 and a second face 7, wherein first face 6 and second face 7 are parallel to one another and are substantially of the same shape (e.g., rectangular) and size. Gripping-portion width GPW may then be measured across first face 6 of gripping portion 5 through a geometric center of first face 6 and/or second face 7.

Gripping portion 5 may be provided with a plurality of gripping elements 20 extending from gripping portion 5 (e.g., from first face 6). According to some embodiments, gripping elements 20 may extend perpendicularly away from gripping portion 5 such that distal portions of gripping elements 20 are spaced at a predetermined distance from first face 6 and second face 7. Importantly, one of skill will understand that gripping elements 20 may extend in any direction desirable for achieving a desired fastening, and the entire plurality of gripping elements 20 need not extend in the same direction. Any such configuration of gripping elements 20 is intended to fall within the scope of the present disclosure.

Gripping elements 20 may comprise hooks and/or loops whose characteristics enable gripping elements 20 to achieve fastening with another desired surface, for example, a surface comprising a plurality of loops or hooks designed to interact with gripping elements 20 to effect such a fastening. Gripping elements 20 may be arranged in rows and columns whereby gripping elements 20 are arranged with an alternate arrangement of their heads according to the row so as to facilitate the fastening with the second surface. Importantly, gripping elements 20 may not be organized into rows and columns and may be interspersed over first or second faces 6 and 7 as desired.

Gripping elements 20 may cover a substantial area associated with first face 6. For example, coverage of at least 50, 60, 70, 80 and even 90 percent of first face 6 may be effected by gripping elements 20. One skilled in the art will recognize that any desirable coverage amount for gripping elements 20 may be implemented without departing from the scope of the present disclosure.

Fastener 1 may also include a supporting portion 10 that may be defined by at least one supporting-portion wall 11 (e.g., a substantially planar wall) extending from gripping portion 5 (e.g. first face 6 or second face 7) in a direction opposite, i.e., extending away from, that of gripping elements 20 (e.g., perpendicular to second face 7). Importantly, while supporting portion 10, anchoring portion 15, and gripping portion 5 are referred to herein as a separate portions, one of skill will understand that where fastener 1 has been unitarily formed, this reference is for ease of understanding only and that it is not intended that such portions be distinctly separate.

Supporting portion wall or walls 11 may be of any suitable thickness and any desirable height for purposes of setting apart gripping portion 5 and anchoring portion 15. For example, a height of supporting portion walls 11 may represent between 20 and 70 percent of the overall thickness T of fastener 1, where the height of gripping elements 20 is not included in a thickness calculation of fastener 1. Supporting portion walls 11 may follow a periphery defined by gripping portion 5, though offset from the periphery of gripping portion 5 where desired. Supporting portion walls 11 may further define an interior volume, e.g., space 13, within supporting walls 11. Space 13, according to some embodiments may be substantially void of material.

Supporting portion 10 presents a supporting-portion width SPW, as measured in the same direction and the same manner as gripping-portion width GPW, that is smaller than gripping-portion width GPW of gripping portion 5. Thus, a top flange 12 is formed by gripping portion 5 relative to supporting portion 10 on at least one side of fastener 1. For example, where supporting portion 10 includes two supporting-portion walls, a top flange 12 may be formed on two sides of fastener 1 as highlighted at FIG. 3. Importantly, top flange 12 is highlighted at FIG. 3 and is not intended to indicate construction of top flange 12 from a different material. One of skill in the art will recognize that depending on a fastening configuration desired and a shape associated with gripping portion 5, top flange 12 may be present on one, two, three, four, or more sides of fastener 1, based on the configuration of supporting portion walls 11. For example, FIG. 5 provides an exemplary embodiment wherein top flange 12 is present on just one side of fastener 1. Further, remaining sides of gripping portion 5 may be completely void of any top flange 12, such that an edge of gripping portion 5 void of top flange 12 transitions smoothly into supporting portion 10.

Supporting portion 10 may include additional support, for example, for reinforcing supporting portion walls and/or supporting additional features of fastener 1, such as one or more raised portions configured to cause an interference fit of fastener 1 in a housing 70. Such elements will be described in greater detail below.

Supporting portion 10 may, therefore, include a crosspiece 14 extending between supporting portion walls 11, thereby sectioning space 13 defined by supporting portion 10 into subsections 13' as shown at FIG. 1C. Crosspiece 14 may intersect supporting portion walls 11 perpendicularly, or alternatively at any desired angle. Crosspiece 14 may provide reinforcement for supporting portion walls 11 and may also add rigidity to fastener 1.

Where crosspiece 14 is present, space 13 may be sectioned into subsections 13' as noted above. The interior volumes associated with subsections 13' may also be substantially void of material, similarly to space 13, or may contain additional crosspieces 14 further defining additional subsections 13' as desired.

According to some embodiments, supporting-portion width SPW may be between 5 and 95 percent of gripping-portion width GPW, 25 to 75 percent of gripping portion width GPW, and possibly between 65 and 95 percent of gripping portion width. For example, where fastener 1 has a gripping-portion width of 31 mm, such a fastener may have a supporting portion width of between 1.5 and 28.5 mm, e.g., 25 mm. Depending on a particular fastener geometry associated with fastener 1, a difference between gripping-portion width GPW and supporting-portion width SPW may be between 1.5 and 5 mm, for example.

Figure 3:
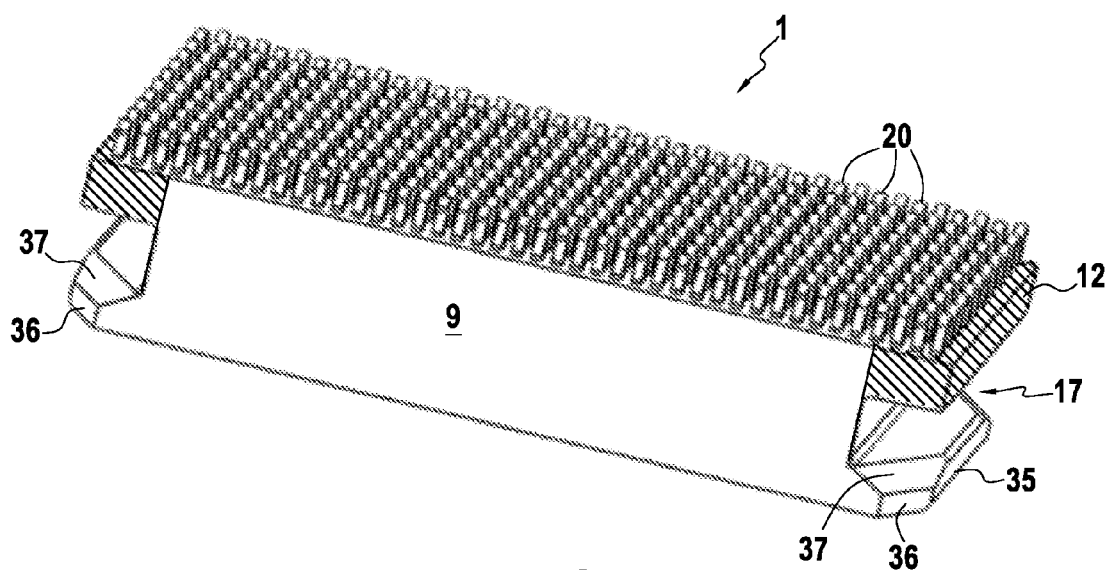
FIG. 3 is a representation of an exemplary fastener device according to embodiments of the present specification highlighting an exemplary top flange.

As noted above, top flange 12 may be formed by gripping portion 5 relative to supporting portion 10 on any number of sides of fastener 1 (e.g., two sides) as shown at FIGS. 3 and 5. One of skill in the art will understand that the above described dimensional aspects may be modified or maintained as desired based on the implemented geometry.

Anchoring portion 15 may be configured to enable fastener 1 to be anchored within a housing 70 or other suitable portion of a part to be fastened, or alternatively to a surface to which the part is to be fastened. Anchoring portion 15 may therefore extend from distal portion 30 of supporting-portion wall 11 and parallel to first face 6 and second face 7 of gripping portion 5 so as to form a bottom flange 35 relative to supporting portion 10 corresponding to top flange 12. Formation of bottom flange 35 may further result in formation of groove 17 between top flange 12 and bottom flange 35. For example, where top flange 12 presents only one flanged side, anchoring portion 15 may present bottom flange 35 on the same side as top flange 12.

Anchoring portion 15 may present an anchoring portion width APW greater than supporting portion width SPW, while being less than, equal to, or greater than gripping portion width GPW. Particularly, anchoring portion width APW may be configured such that upon insertion within housing 70, bottom flange 35 and top flange 12 act to restrain fastener 1 in at least two directions.

As noted above, anchoring portion 15 may be formed integrally with supporting portion 10 and gripping portion 5, such that fastener 1 is of one-piece construction.

Bottom flange 35 may include at least one chamfer 36. Chamfer 36 may be configured, for example, to facilitate insertion of anchoring portion 15 into housing 70 corresponding to a part to be fastened or a part to which the part to be fastened will be affixed. Chamfer 36 may therefore be located at a terminal section of bottom flange 35, for example, each corner associated with bottom flange 35 may be chamfered such that at least one chamfer extends in a direction parallel to second face 7 of gripping portion 5.

Chamfer 36 may form an angle with a plane perpendicular to second face 7 ranging between 1 and 60 degrees, for example, between 20 and 45 degrees. Chamfer 36, being located on a terminal portion of bottom flange 35 can be present on a leading portion of anchoring portion 15 as anchoring portion 15 is installed into housing 70.

Alternatively, or in addition to chamfer 36, bottom flange 35 may include a top chamfer 37 formed at a terminal portion of bottom flange 35, in conjunction with chamfer 36 where present. Such top chamfer 37 may form an acute angle when measured relative to second face 7, for example, between about 10 and 30 degrees. Top chamfer 37 may be desirable where, for example, anchoring portion 35 is to be installed in channel type or other narrow height housing 70.

According to some embodiments, fastener 1 may include one or more protrusions 40 configured to result in an interference fit of anchoring portion 15 in a housing when installed. Protrusion 40 may be formed as additional material at particular locations on fastener 1, and may present a variety of shapes and sizes. For example, protrusion 40 may be unitarily formed with fastener 1 and may further be of arcuate or partially spherical shape.

FIG. 6 is an exemplary representation highlighting placement of one or more protrusions 40 according to embodiments of the present disclosure. One or more protrusions 40 may be formed at various locations of fastener 1, for example, extending from a plane comprising a bottom surface of anchoring portion 15 and beyond an envelope surface of body 9 (e.g., extending from crosspiece 14). According to some embodiments, protrusion 40 may be located at a geometric center of the plane comprising a bottom surface of anchoring portion 15. In addition, or alternatively, protrusion 40 may be located within groove 17, and may extend perpendicular or parallel to second face 7.

Importantly, any combination of locations for one or more protrusions 40 may be implemented without departing from the scope of the present disclosure.

Where an arcuate or partially spherical shape is implemented for protrusion 40, protrusion 40 may present a radius of curvature of between 2 and 3 times thickness T of fastener 1. For example, a protrusion may have a radius of curvature ranging between 10 and 30 mm, 14 and 18 mm, for example 16 mm. One of skill will recognize that where opposed protrusions 40 are implemented, e.g., on second face 7 and a top surface of anchoring portion 15, this radius of curvature may be modified to facilitate installation of fastener 1 while continuing to provide a desired level of interference between the installed portions.

One of skill in the art will recognize upon reading the present disclosure that fastener 1 can be implemented in any number of designs for effecting a fastening. For example, automotive headliners, door liners, and other elements may be securely fastened while enabling easy removal when repairs or other conditions dictate.

Further, by implementing protrusions 40, the resulting interference may reduce or eliminate rattle and movement of fastener 1 in its installed condition.

Although the present disclosure herein has been described with reference to particular embodiments, it is to be understood that these embodiments are merely illustrative of the principles and applications of the present disclosure.

For example, the fastener described herein may be formed by a combination of techniques including injection molding. In such embodiments, it may be possible to form anchoring portion 15, supporting portion 10, and gripping portion 5 without gripping elements 20, together by injection molding. Following fabrication of these three portions, a layer having gripping elements 20, and, for example, an adhesive, may be brought into contact with first face 6 of gripping portion 5, to result in a completed fastener 1. Similar assembly techniques may also be realized for each portion, resulting in a varied collection of sized and shapes. Subsequent assembly of each portion may then be performed to result in a fastener of a desired shape and size.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances, unless otherwise specified herein.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

It is intended that the specification and examples be considered as exemplary only, with a true scope of the disclosure being indicated by the following claims.

What is claimed is:

1. A fastening element, comprising:
a gripping portion;
a plurality of gripping elements extending from the gripping portion;
a supporting portion being defined by at least two supporting-portion walls extending from the gripping portion in a direction opposite that of the gripping elements, the supporting portion having a supporting-portion width smaller than a gripping-portion width of the gripping portion, such that a top flange is formed by the gripping portion relative to the supporting portion on at least one side of the fastening element; and
an anchoring portion extending from a distal end of at least one supporting-portion wall and parallel to the gripping portion thereby defining a bottom flange relative to the supporting portion on the at least one side corresponding to the top flange,
wherein one or more protrusions extend from a plane comprising a bottom surface of the anchoring portion in a direction opposite that of the gripping elements, wherein the one or more protrusions are configured to exert a reactive force on the bottom flange following installation of the fastening element, wherein a crosspiece extends between the at least two supporting-portion walls, and wherein a surface of the crosspiece is co-planar with the bottom surface.

2. The fastening element according to claim 1, wherein the fastening element, the plurality of gripping elements, the supporting portion, and the anchoring portion are together formed unitarily.

3. The fastening element according to claim 1, wherein the crosspiece comprises the one or more protrusions.

4. The fastening element according to claim 1, wherein an interior volume defined by the supporting-portion walls is substantially void.

5. The fastening element according to claim 1, wherein the supporting-portion width is between 5 and 95 percent of the gripping portion width.

6. The fastening element according to claim 1, wherein at least two other sides of the gripping portion and the anchoring portion are void of any flange.

7. The fastening element according to claim 1, wherein a thickness of the fastening element, defined as the distance from a plane comprising a top of a first face to a plane comprising a bottom surface of the anchoring portion, is between 4 and 10 millimeters.

8. A fastening element having a body, comprising:
a gripping portion;
a plurality of gripping elements extending away from the gripping portion;
a supporting portion defined by at least two supporting-portion walls extending from the gripping portion in a direction opposite of the gripping elements;
a crosspiece extending between the at least two supporting-portion walls;
an anchoring portion extending from a distal end of at least one supporting-portion wall and extending opposite and parallel to the gripping portion thereby defining a flange portion relative to the gripping portion and a groove therebetween; and
a first protrusion, wherein the first protrusion extends from a plane comprising a surface of the anchoring portion or the gripping portion and beyond an envelope surface of the fastening element body in a direction different from that of the plurality of gripping elements, or the first protrusion extends within the groove, and wherein the gripping portion, the plurality of gripping elements, the anchoring portion, and the first protrusion are rigid,
wherein the first protrusion is configured to exert a reactive force on the flange portion following installation of the fastening element, and wherein a surface of the crosspiece is coplanar with the surface of the anchoring portion.

9. The fastening element according to claim 8, further including a second protrusion, wherein at least one of the first protrusion and second protrusion extends within the groove.

10. The fastening element according to claim 8, wherein at least a portion of an edge of the first protrusion is arcuate.

11. The fastening element according to claim 8, wherein the first protrusion is at least partially spherical.

12. The fastening element according to claim 8, wherein the first protrusion has a radius of curvature ranging between 14 and 18 millimeters.

13. The fastening element according to claim 8, wherein the first protrusion is located at the center of the plane.

14. A fastening element, comprising:
a gripping portion;
a plurality of gripping elements extending from the gripping portion;
a supporting portion being defined by at least two supporting-portion walls extending from the gripping portion in a direction opposite that of the gripping elements, the supporting portion having a supporting-portion width smaller than a gripping-portion width of the gripping portion, such that a top flange is formed by the gripping portion relative to the supporting portion on at least one side of the fastening element;
a crosspiece extending between the at least two supporting-portion walls; and
an anchoring portion extending from a distal end of at least one supporting-portion wall and parallel to the gripping portion thereby defining a bottom flange relative to the supporting portion on the at least one side corresponding to the top flange, wherein
one or more protrusions extend from a plane comprising a bottom surface of the anchoring portion in a direction opposite that of the gripping elements,
wherein the bottom flange comprises at least one chamfer located at a distal section of the bottom flange, and
wherein the one or more protrusions are configured to exert a reactive force on the bottom flange following installation of the fastening element, and
wherein a surface of the crosspiece is co-planar with the bottom surface.

* * * * *